2,776,276

ROSIN HYDROGENATION

Arthur L. Glasebrook, Alfred N. Hoffmann, and James B. Montgomery, Wilmington, Del., assignors to Hercules Powder Company, Wilmington, Del., a corporation of Delaware No Drawing. Application August 18, 1953, Serial No. 375,068

20 Claims. (Cl. 260—100)

This invention relates to the hydrogenation of rosin and rosin compounds and more particularly to a method of substantially completely hydrogenating rosin and rosin compounds in the presence of a noble metal catalyst.

It is known that rosin may be hydrogenated and base metal catalysts have been used to catalyze such hydrogenation reactions for some time. However, base metal catalysts are incapable of producing a completely saturated rosin compound and, in addition, when employed at elevated temperatures and pressures, considerable degradation of the rosin compound results. These catalysts are, therefore, not entirely satisfactory. Noble metal catalysts have also been employed in hydrogenation processes but these processes are also wanting in certain respects. With noble metal catalysts, it has heretofore been found necessary, in order to achieve a substantial degree of hydrogenation, to dissolve the rosin compounds in a solvent prior to hydrogenation and these processes have resulted in problems involving corrosive solvents, limited solubility of the rosin compound in the solvent, recovery of the hydrogenated rosin compound from the solvent, and also large catalyst requirements. There has been a need for a process whereby a substantially completely hydrogenated rosin compound could be prepared with a small quantity of catalyst in the absence of a solvent and without any appreciable degradation of the rosin compound during the hydrogenation reaction.

Now in accordance with this invention, it has been found that rosin and rosin compounds can be substantially completely hydrogenated in the molten state by treatment with hydrogen at a temperature less than 300° C. and a pressure of at least 3000 p. s. i. g. in the presence of one of the noble metal catalysts found in period IV, series 6, group VIII of the Mendeleeff Periodic Table. The process of this invention is carried out in the complete absence of solvents.

The rosins which may be hydrogenated according to this invention may be those obtained by extraction from the stumps of the Jeffrey and Ponderosa pines as well as the rosins well known to the art such as, for example, the rosins obtained from the Southern long-leaf pine tree. The rosins may be of either the crude or refined types having color grades ranging from FF to WW and may be of either the wood or gum variety. Besides ordinary rosin, dehydrogenated or disproportionated rosins, polymerized rosins, and partially hydrogenated rosins may also be hydrogenated by the process of this invention. These rosins contain, in addition to rosin acids, a non-acidic or neutral portion which may be present in amounts varying between 8.7% and about 24.4% by weight. They have acid numbers varying between 140 and 170. The refined types of rosin which may be treated in accordance with the invention are those which have been distilled under reduced pressure; distilled under reduced pressure with the injection of an inert gas; extracted with color body solvents; treated with various adsorbents for the removal of various impurities, as color bodies, visible and latent, oxidized resin acids, etc. Furthermore, the rosin may be subjected to a preliminary heat-treatment before it is subjected to hydrogenation. If desired, the heat-treatment step may follow the treatment with hydrogen as may the other refining treatments given hereinabove. Desirably, the heat-treatment will be carried out in an inert atmosphere, as, for example, carbon dioxide, nitrogen, etc.

In addition to wood and gum rosin, the resin compounds which may be hydrogenated in accordance with this invention include also the acids attainable from these rosins such as, for example, abietic, dehydroabietic, dihydroabietic, neoabietic, levopimaric, dextropimaric, isodextropimaric, etc.; esters of these rosin acids with a monohydric or polyhydric alcohol such as methyl abietate, ethyl abietate, glycerol abietate, pentaerythritol abietate, etc.; the alcohols produced by the reduction of the carboxyl group of a rosin acid such as abietyl alcohol, pimaryl alcohol, etc., and also the esters of these alcohols. Also rosin acids containing materials such as tall oil and rosins separated from tall oil, such as sulfate wood rosin, may be hydrogenated according to this invention. It is desirable to remove catalyst poisoning constituents from such material prior to the hydrogenation.

The catalysts operable in this invention are the noble metal catalysts rhodium, palladium, and ruthenium. These noble metals have been found to behave differently as hydrogenation catalysts than do metals such as platinum or osmium in that neither of the latter is capable of producing a completely saturated rosin compound in accordance with the process of this invention. The catalysts of this invention may be used with or without supports. Charcoal, alumina, and rutile have been found to be satisfactory as supporting materials and other materials may likewise be used for this purpose. The supported catalysts are effective whether in the form of pellets or powder.

The quantity of catalyst necessary in carrying out this invention varies widely. It has been found that when carrying out the process of this invention in the absence of an aqueous phase substantially complete saturation of a rosin compound may be achieved with ratios of noble metal to rosin compound as small as 1:2000 on a parts by weight basis and even a smaller ratio can be used according to a specific embodiment of this invention. Thus, if, as shown in Example XVI following, the hydrogenation is carried out in the presence of about 10% water based upon the weight of rosin material, it is possible to obtain substantially complete saturation of the rosin compound at a 1:4000 noble metal-to-rosin compound ratio. In order to obtain the beneficial effects of the presence of water during the hydrogenation, at least about 5% water based upon the weight of rosin material must be present. If less than this quantity of water is utilized, the rate of hydrogenation will not be appreciably faster than with anhydrous conditions. There appears to be no critical limit with regard to the maximum amount of water which may be employed. Under the conditions of the reaction, the water must be immiscible with the rosin.

Hereinafter in this specification, the term "substantially completely hydrogenated rosin" will be employed to denote a hydrogenated rosin which has absorbed at least 1.22% hydrogen on the basis of the unhydrogenated rosin. A "substantially completely hydrogenated rosin compound" will denote a rosin compound having absorbed at least 1.22% hydrogen on the basis of the rosin equivalent of the unhydrogenated rosin compound. Thus, for example, ester gum may be made from rosins having various acid numbers and correspondingly different neutral body contents. Any ester gum, therefore, has a rosin component and the amount of rosin required to make any such ester gum can be calculated. This corresponding amount of rosin will be considered herein to be the rosin equivalent of the particular compound under consideration. The hydrogenated rosins and rosin compounds produced according to this invention will show a hydrogen absorption based on the original unsaturated rosin of between 1.22% and 1.66% or even higher. The product will be substantially completely resistant to oxidation and subsequent decomposition.

As a prelude to the disclosure of the more specific processes of this invention, it is felt desirable to give some consideration to the manner in which the hydrogen absorption of rosin has heretofore been reported. For example, in U. S. Patent 2,113,808 to Humphrey, the extent of hydrogenation is expressed as the percentage of the total possible saturation of the two double bonds in the rosin acids which are present in the rosin before hydrogenation (rosin acid basis). Thus, the percentage saturation is arrived at by multiplying by 100 the ratio of hydrogen actually absorbed to the theoretical amount of hydrogen which could be absorbed on the basis of the rosin acids present. This procedure involves two assumptions: (1) that only the rosin acids of the rosin are hydrogenated and (2) that the acidic portion of the rosin has an average molecular weight of 302 as has abietic acid. The first of these assumptions was made in the absence of any information to the contrary at the time. However, it is now known that part of the nonacidic portion of rosin actually absorbs hydrogen at a higher rate and to a greater extent than the acidic portion. To avoid this incorrect assumption, the products of the present invention will be described by the percentage hydrogen absorbed. The conversion of the extent of hydrogenation from one basis to the other may be accomplished as follows:

$$C = 0.01333 A \frac{\text{Acid number of rosin}}{185.5}$$

where
$C$=percent hydrogen absorbed on hydrogenation.
$A$=percent saturation on "rosin acid basis."
$185.5$=acid number of pure rosin acid having a molecular weight of 302.4.
$0.01333$=weight of hydrogen required to saturate 1 gram of rosin acid having a molecular weight of 302.4.

There follow several specific examples which illustrate particular embodiments of the process of this invention. All quantities are on a parts by weight basis unless otherwise indicated.

*Example I*

N wood rosin in the amount of 450 parts having an acid number of 162.5, a melting point of 87° C., and a hydrogen absorption value of 1.44% was placed in a stainless steel rocking-type autoclave along with 9 parts of a commercial powdered 5% palladium-on-activated-charcoal catalyst. The air was displaced with nitrogen and the nitrogen with hydrogen and the autoclave was pressured to 3500 p. s. i. g. with hydrogen. While agitating the reaction mixture the temperature was raised to 200° C. The reaction mixture was maintained at 200° C. and a pressure of about 5000 p. s. i. g. with rocking agitation for 8.5 hours. The autoclave was then cooled, the hydrogen released, and the product dissolved in toluene and filtered. The toluene was removed by distilling under a vacuum with a slow sparge of carbon dioxide. The product was found to have absorbed hydrogen to the extent of 1.42% on the basis of the original rosin. This corresponded with a saturation of 122% of the two double bonds on the "rosin acid basis" as heretofore described. The product had an acid number of 163 and a melting point of 84° C. showing that negligible degradation of the rosin had occurred.

*Example II*

N wood rosin in the amount of 500 parts, having an acid number of 162.5, was hydrogenated according to the procedure of Example I with the exception that 5 parts of a commercial powdered 5% palladium-on-activated-charcoal catalyst was employed. After 20.8 hours, it was found that the rosin had absorbed hydrogen to the extent of 1.39% on the basis of the original rosin. This corresponded with a saturation of 120% of the two double bonds on the "rosin acid basis" as heretofore described. The product had an acid number of 160.5 and a melting point of 85° C. indicating negligible degradation of the rosin during the hydrogenation.

*Example III*

N wood rosin in the amount of 400 parts, having an acid number of 166, was hydrogenated according to the procedure of Example I. Here, however, 8 parts of a commercial powdered 5% rhodium-on-activated-charcoal was used as the catalyst. After 19 hours it was found that the rosin had absorbed hydrogen to the extent of 1.45% based on the original rosin. The product had an acid number of 161 and a melting point of 80° C.

*Example IV*

N wood rosin in the amount of 400 parts was charged into a stainless steel rocking-type autoclave along with 8 parts of a commercial powdered 5% ruthenium-on-activated-charcoal catalyst. The air was displaced with nitrogen, the nitrogen with hydrogen, and the autoclave pressured with 3500 p. s. i. g. with hydrogen. While agitating the mixture, the temperature was raised to 240° C. The reaction mixture was maintained at 240° C. and at a pressure of 5000 p. s. i. g. for 8 hours. Samples were withdrawn at approximately hourly intervals and after each sample was removed, the autoclave was vented to atmospheric pressure and repressured with fresh hydrogen. The product was found to have absorbed hydrogen to the extent of 1.50% based upon the original rosin and was, therefore, completely saturated with hydrogen. The product had an acid number of 142.

*Example V*

N wood rosin in the amount of 400 parts having an acid number of 165 and a melting point of 82.5° C. was hydrogenated in the presence of 8 parts of a commercial 5% palladium-on-alumina catalyst according to the procedure of Example I. After 8 hours it was found that the rosin had absorbed hydrogen to the extent of 1.36% based on the original rosin. The product had an acid number of 164 and a melting point of 81° C.

*Example VI*

N wood rosin in the amount of 400 parts having an acid number of 165 and a melting point of 82.5° C. was hydrogenated in the presence of 8 parts of 5% palladium-on-rutile catalyst according to the procedure of Example I. After 4.5 hours, it was found that the rosin had absorbed hydrogen to the extent of 1.43% based on the original rosin. The product had an acid number of 166 and a melting point of 82° C.

*Example VII*

Dehydrogenated rosin (54% dehydroabietic acid, 0% abietic acid) in the amount of 400 parts was hydrogenated in the presence of 6 parts of a commercial 5% powdered palladium-on-activated-charcoal catalyst at 3000, 5000, and 8000 p. s. i. g., respectively. After displacing the air in the autoclave with nitrogen and the nitrogen with hydrogen, the autoclave was rapidly heated to 200° C. under approximately 200 p. s. i. g. of hydrogen. The bomb was then pressured with hydrogen to the desired operating level and the hydrogenation was allowed to proceed at 200° C. It was found that at a hydrogen pressure of 3000 p. s. i. g. approximately 7 hours were required to attain a product which had absorbed hydrogen to the extent of 1.42% on the basis of the original dehydrogenated rosin. With 5000 p. s. i. g. hydrogen pressure this same product could be attained in 3 hours and with 8000 p. s. i. g. hydrogen pressure, the time necessary to produce such a product was reduced to 2 hours.

*Example VIII*

N wood rosin in the amount of 400 parts was hydrogenated in the presence of 6 parts of a commercial powdered 5% palladium-on-activated-charcoal catalyst at 200° C. and 5000 p. s. i. g. hydrogen pressure according to the procedure of Example I. Samples were taken periodically. It was found that 19 hours after operating temperatures were obtained the product had adsorbed hydrogen to the extent of 1.42% based on the original rosin.

*Example IX*

N wood rosin was hydrogenated according to the procedure of Example VIII. However, in this case the autoclave was completely vented and repressured with fresh hydrogen at 15-minute intervals throughout the first 2 hours and subsequently at hourly intervals. Samples were taken at intervals. It was found that a product which had absorbed hydrogen to the extent of 1.42% based on the original rosin was obtained in this manner 3.8 hours following the attainment of the operating temperature.

*Example X*

N wood rosin was hydrogenated at 240° C. according to the procedure of Example IX. A product which had absorbed hydrogen to the extent of 1.42% based on the original rosin was produced in 1 hour.

*Example XI*

N wood rosin was hydrogenated at 275° C. according to the process of Example VIII. A product which had absorbed hydrogen to the extent of 1.42% based on the original rosin was produced by this method in 2 hours.

*Example XII*

N wood rosin was hydrogenated at 275° C. according to the process of Example IX. A product which had absorbed hydrogen to the extent of 1.42% based on the original rosin was produced by this method in 20 minutes.

*Example XIII*

Fractionated N wood rosin in an amount of 350 parts having an acid number of 183 and a melting point of 94° C. was hydrogenated according to the procedure of Example I in the presence of 5.25 parts of a commercial 5% palladium-on-powdered-charcoal catalyst. The reaction mixture was maintained at 200° C. and 5000 p. s. i. g. hydrogen pressure for 4 hours with rocking agitation, liquid samples being taken periodically to follow the course of the reaction. After 15 minutes of hydrogenation at 200° C. the dehydroabietic acid content of the rosin had dropped from 19% to 1% and the hydrogen absorption from 1.0% to 0.06%. After 30 minutes it was found that the rosin had a hydrogen absorption value of 0.00% showing that the rosin was completely saturated with hydrogen. The product had an acid number of 182 and a drop melting point of 93.5° C. showing that very little degradation of the rosin had occurred.

*Example XIV*

Commercial methyl ester of rosin in the amount of 600 parts having a hydrogen absorption value of 1.50% was hydrogenated according to the procedure of Example I in the presence of 3 parts of a commercial 5% palladium-on-powdered-charcoal catalyst. After maintaining the reaction mixture at 200° C. under 5000 p. s. i. g. hydrogen pressure for 20 hours, the product was found to have absorbed hydrogen to the extent of 1.44% based on the original rosin ester. The saponification number of the product was 158 as compared with 165 for the starting material.

*Example XV*

Four hundred parts of commercial hydroabietyl alcohol was hydrogenated according to the procedure of Example I in the presence of 6 parts of a commercial powdered 5% palladium-on-activated-charcoal catalyst. The reaction mixture was maintained at 5000 p. s. i. g. hydrogen pressure at 200° C. for 6 hours. The product was found to have a hydrogen absorption value of 0.04% showing that the hydroabietyl alcohol was substantially completely saturated. The product had an hydroxyl content of 5.08% as compared with 5.05% for the starting material showing that practically no degradation of the alcohol had taken place.

*Example XVI*

Four hundred parts of N wood rosin and 2 parts of a commercial powdered 5% palladium-on-activated-charcoal catalyst was charged into a stainless steel autoclave along with 40 parts of distilled water. The mixture was agitated under a hydrogen pressure of 5000 p. s. i. g. for 10 hours at 200° C. The pressure was then released and the molten product removed and allowed to cool under an inert atmosphere. The product had absorbed hydrogen to the extent of 1.44% based on the original rosin. The acid number had decreased from 166 to 159 showing that very little degradation of the rosin had occurred.

*Example XVII*

N wood rosin in the amount of 400 parts having an acid number of 163, a melting point of 81° C., and a hydrogen absorption value of 1.45% was placed in a stainless steel rocking-type autoclave with 32 parts of a commercial 5% palladium-on-activated-charcoal catalyst. The air was displaced with nitrogen and the nitrogen with hydrogen and the autoclave was pressured to 5500 p. s. i. g. with hydrogen. While agitating the reaction mixture, the temperature was raised to 125° C. over a period of 40 minutes. The reaction mixture was maintained at 125° C. and a pressure of 7000 p. s. i. g. with rocking agitation for 114 hours. During this time the autoclave was completely vented and repressured with fresh hydrogen intermittently. The product, which was recovered by the procedure of Example I, was found to have absorbed hydrogen to the extent of 1.36% on the basis of the original rosin. This corresponded with a saturation of 116% of the two double bonds on the "rosin acid basis" as heretofore described. The product had an acid number of 162 and a melting point of 81° C. showing that negligible degradation of the rosin had occurred.

*Example XVIII*

Four hundred parts of K gum rosin which had been washed with water and which had an acid number of 166, a melting point of 81° C. and a hydrogen absorption value of 1.45% was hydrogenated in the presence of 6 parts of a commercial 5% palladium-on-activated-charcoal catalyst according to the procedure of Example I. However, in this case the reaction mixture was raised to a temperature of 240° C. over a period of 1 hour and 23 minutes. The reaction mixture was maintained at 240° C. and a pressure of 5000 p. s. i. g. with rocking agitation for 8 hours. During this time, the autoclave was completely vented and repressured with fresh hydrogen intermittently. Samples of the reaction mixture were obtained periodically. It was found that after 3 hours of reaction time the K gum rosin had become completely saturated with hydrogen and contained no dehydroabietic acid. The product had an acid number of 160, a melting point of 80° C. and had absorbed hydrogen to the extent of 1.45% on the basis of the original rosin.

The conditions of temperature and pressure may be varied widely in carrying out this invention. In general, temperatures between about 125° C. and 300° C. are operable but temperatures between 200° and 275° C. are definitely preferred as resulting in the most desirable reaction rates with the least attendant degradation of the rosin or rosin compound. A temperature of 260° C. is particularly preferred as producing the optimum rate of hydrogenation. The rate of hydrogenation increases up to this temperature and decreases somewhat above this temperature. Also, at temperatures in excess of 260° C. the rate of rosin degradation increases, and there is an added tendency for the catalyst to be poisoned.

There appears to be no upper limit to the pressure which may be employed in this invention. On the other hand, a substantially completely saturated rosin or rosin compound can be prepared at hydrogen pressures as low as 3000 p. s. i. g. At pressures less than 3000 the hydrogenation product exhibits a decided tendency toward dehydrogenation during subsequent recovery by flash distillation with consequent reduction in the degree of saturation. A pressure of at least 3000 p. s. i. g. is critical therefore for the production of the substantially completely hydrogenated product of this invention. A pressure range from about 5000 to 15,000 p. s. i. g. is preferred as resulting in the most practical reaction rates. A pressure of 6000 p. s. i. g. is optimum for the production of the highest quality product and the best reaction rates.

As shown by Examples IX, X, XII and XVIII, the rate of hydrogenation of rosin compounds according to this invention may be appreciably increased by replacing the hydrogen in the autoclave periodically with fresh hydrogen. While not necessary for the successful operation of the process, it is desirable from the standpoint of efficiency to cycle the hydrogen released from the reaction vessel through a methanator or similar apparatus to remove carbon oxides and then to recycle the hydrogen to the reaction vessel. In this way, it is possible to continuously replace contaminated hydrogen in the reaction vessel with fresh hydrogen. Although in the examples the hydrogen in the autoclave was completely removed intermittently, equivalent fast rates can also be obtained when the hydrogen is replaced continuously at operating pressure.

The hydrogenated rosins prepared in accordance with this invention are characterized by the fact that they are substantially completely resistant to oxidation. These substantially completely saturated rosins are particularly useful in applications where stability is required in oxidizing atmospheres.

This is a continuation-in-part of our application Serial No. 184,902, filed September 14, 1950.

What we claim and desire to protect by Letters Patent is:

1. The process which comprises subjecting a material containing a compound selected from the group consisting of rosin acids, esters of rosin acids, alcohols produced by the reduction of the carboxyl group of a rosin acid, and esters of said alcohols to treatment with hydrogen at a temperature of from about 125° C. to about 300° C. and a pressure of at least 3000 p. s. i. g. in the presence of a noble metal catalyst selected from the group consisting of palladium, rhodium, and ruthenium and continuing the treatment with hydrogen until a substantially completely hydrogenated product is produced.

2. The process of claim 1 wherein the temperature is between about 200° C. and about 275° C.

3. The process of claim 2 wherein the catalyst is ruthenium and the material subjected to treatment with hydrogen is rosin.

4. The process of claim 2 wherein the catalyst is rhodium and the material subjected to treatment with hydrogen is rosin.

5. The process of claim 1 wherein the temperature is about 260° C. and the pressure is about 5000–10,000 p. s. i. g.

6. The process of claim 1 in which the hydrogen is continuously removed from the reaction vessel and replaced with fresh hydrogen.

7. The process of claim 6 wherein the temperature is about 260° C. and the pressure is about 5000–10,000 p. s. i. g.

8. The process of claim 1 wherein the catalyst is rhodium.

9. The process of claim 1 wherein the catalyst is ruthenium.

10. The process of claim 1 wherein the catalyst is palladium.

11. The process of claim 1 wherein the material subjected to hydrogenation is rosin.

12. The process of claim 11 wherein the catalyst is palladium.

13. The process of claim 12 wherein the temperature is about 260° C. and the pressure is about 5000–10,000 p. s. i. g.

14. The process of claim 12 wherein the temperature is between about 200° C. and 275° C.

15. The process of claim 14 in which the hydrogen is intermittently removed from the reaction vessel and replaced with fresh hydrogen.

16. The process of claim 14 carried out in the presence of at least 5% water based upon the weight of rosin material.

17. The process of claim 16 in which the hydrogen is continuously removed from the reaction vessel and replaced with fresh hydrogen.

18. The process of claim 14 in which the hydrogen is continuously removed from the reaction vessel and replaced with fresh hydrogen.

19. The process of claim 14 in which the hydrogen is continuously removed from the reaction vessel, treated to remove carbon oxides, and recycled to the reaction vessel.

20. The process of claim 19 wherein the temperature is 260° C. and the pressure is 5000–10,000 p. s. i. g.

References Cited in the file of this patent

UNITED STATES PATENTS

| | | |
|---|---|---|
| 2,113,808 | Humphrey | Apr. 12, 1938 |
| 2,155,036 | Byrkit | Apr. 18, 1939 |
| 2,358,235 | Lazier | Sept. 12, 1944 |
| 2,367,287 | Kirkpatrick | Jan. 16, 1945 |
| 2,389,284 | Turck et al. | Nov. 20, 1945 |
| 2,392,952 | Schmidt | Jan. 15, 1946 |
| 2,727,885 | Hoffman et al. | Dec. 20, 1955 |